United States Patent
Kim et al.

(10) Patent No.: US 8,155,303 B2
(45) Date of Patent: Apr. 10, 2012

(54) SYSTEM AND METHOD FOR CANCELLING ECHO

(75) Inventors: Chonghoon Kim, Seoul (KR); Yeongha Choi, Anyang-si (KR); Hyungchae Kim, Seoul (KR)

(73) Assignee: Solid Technologies, Inc. (KR)

( * ) Notice: Subject to any disclaimer, the term of this patent is extended or adjusted under 35 U.S.C. 154(b) by 1176 days.

(21) Appl. No.: 11/855,421

(22) Filed: Sep. 14, 2007

(65) Prior Publication Data

US 2008/0205661 A1  Aug. 28, 2008

(30) Foreign Application Priority Data

Sep. 14, 2006 (KR) .................. 10-2006-0088984

(51) Int. Cl.
*H04M 9/08* (2006.01)
*H04B 7/14* (2006.01)
*H04B 1/44* (2006.01)
*H04B 3/20* (2006.01)

(52) U.S. Cl. ....... 379/406.08; 455/24; 455/78; 370/286; 370/289

(58) Field of Classification Search .................. 455/1, 7, 455/14, 22, 24, 501, 63, 63.1, 67.3, 570, 455/114.2, 50.1; 375/211, 350
See application file for complete search history.

(56) References Cited

U.S. PATENT DOCUMENTS

| | | | | |
|---|---|---|---|---|
| 3,649,771 A | * | 3/1972 | Flowers | ...................... 340/13.34 |
| 5,414,766 A | | 5/1995 | Cannalire et al. | |
| 6,442,274 B1 | | 8/2002 | Sugiyama | |
| 6,510,225 B1 | | 1/2003 | Robertson et al. | |
| 6,654,463 B1 | | 11/2003 | Leonidov et al. | |
| 6,934,387 B1 | | 8/2005 | Kim | |
| 2002/0032004 A1 | * | 3/2002 | Widrow | ........................... 455/22 |
| 2002/0181699 A1 | * | 12/2002 | Pham et al. | ............. 379/406.08 |
| 2003/0022626 A1 | * | 1/2003 | Miquel et al. | .................... 455/24 |
| 2004/0190659 A1 | * | 9/2004 | Raj et al. | ........................ 375/350 |
| 2005/0063490 A1 | * | 3/2005 | Grewing et al. | ............. 375/322 |
| 2005/0163250 A1 | * | 7/2005 | McCallister | .................. 375/296 |
| 2005/0215193 A1 | * | 9/2005 | Kummetz | ......................... 455/1 |
| 2005/0265544 A1 | * | 12/2005 | Imata | ...................... 379/406.08 |

FOREIGN PATENT DOCUMENTS

| | | |
|---|---|---|
| JP | 2000-341243 A | 12/2000 |
| JP | 2001-007750 A | 1/2001 |
| JP | 2001-028562 A | 1/2001 |
| JP | 2003-174430 A | 6/2003 |
| JP | 2005-086448 A | 3/2005 |

OTHER PUBLICATIONS

International Search Report for corresponding International Application No. PCT/KR2007/004438 dated Dec. 26, 2007.

* cited by examiner

*Primary Examiner* — Fan Tsang
*Assistant Examiner* — Jeffrey Lytle
(74) *Attorney, Agent, or Firm* — Cantor Colburn LLP

(57) ABSTRACT

A system and a method for canceling an echo is disclosed. In accordance with the system and the method, a plurality of independently and variably delayed adaptive algorithm blocks are selectively applied to a delayed feedback signal to generate a plurality of echo components in parallel, thereby canceling the echo component from an input signal.

19 Claims, 12 Drawing Sheets

PRIOR ART

SYSTEM AND METHOD FOR CANCELLING ECHO

This application claims priority to Korean Patent Application No. 10-2006-0088984, filed on Sep. 14, 2006, and all the benefits accruing therefrom under 35 U.S.C. §119, the contents of which in its entirety are herein incorporated by reference.

BACKGROUND OF INVENTION

1. Field of the Invention

The present invention relates to a system and a method for canceling an echo, and in particular to a system and a method for canceling an echo wherein a plurality of independently and variably delayed adaptive algorithm blocks are selectively applied to a delayed feedback signal to generate a plurality of echo components in parallel, thereby effectively canceling the echo component from an input signal.

2. Description of the Related Art

As a wireless communication service progresses, a need for a wireless repeater for expanding a communication service to a radio frequency wave shadow area is increasing. However, in case of the wireless repeater, a portion of a repeated signal S(t) transmitted from a transmission antenna 19 is fed back through a receiving antenna 11 of the repeater 10 as an echo component e(t) because frequencies of a received signal r(t) and repeated signal S(t) are identical. Therefore, an oscillation of the repeater 10 occurs due to an amplification of the echo component e(t) within the repeater 10 as shown in FIG. 1.

In order to prevent the oscillation, an interference canceller system (ICS) repeater which cancels the echo component through a digital signal processing by subjecting the received signal to an intermediate frequency converter 13 and an analog-to-digital converter 14 is used. In order to cancel the echo component, an adaptive algorithm filter is generally used. Least mean squares (LMS), RLS, LSL and IIR filters are examples of the adaptive algorithm filter. However, the LMS filter which is stable and requires a small amount of calculation is widely used as the adaptive algorithm filter.

It is important to determine a number of filter taps sufficient for canceling the echo component when designing the adaptive filter. Theoretically, when the number of the filter taps is set to be more than a maximum delay time of the echo path, a complete cancellation of the echo component is possible. However, a structure of the adaptive filter becomes complex, an operation load increases and a signal distortion is increased due to a quantization noise generated in the adaptive filter where the echo component is small.

BRIEF SUMMARY OF THE INVENTION

It is an object of the present invention to provide a system, a wireless repeater and a method for canceling an echo wherein an adaptive filter including a plurality of adaptive algorithm blocks having a small number of filter taps independently allocates each of the adaptive algorithm blocks to a time period of a delayed feedback signal discretely or redundantly to easily cancel an echo component close to a maximum delay time without increasing the number of the filter taps.

In accordance with a preferred embodiment of the present invention, it is an object of the present invention to provide a system, a wireless repeater and a method for canceling an echo wherein a delay time of a plurality of variable delaying means is obtained through a correlation operation of an input signal and a delayed feedback signal to remove a plurality of echo components through the plurality of variable delaying means included in each of adaptive algorithm blocks.

In accordance with another preferred embodiment of the present invention, it is another object of the present invention to provide a system, a wireless repeater and a method for canceling an echo wherein a plurality of adaptive algorithm blocks having a small number of filter taps are applied to a delayed signal of a signal having an echo component thereof removed to easily cancel fading component by multiple paths of a region from a base station or a mobile station to the repeater.

In accordance with a preferred embodiment of the present invention, it is yet another object of the present invention to provide a system, a wireless repeater and a method for canceling an echo wherein an echo cancellation rate of an adaptive filter is easily monitored through a correlation operation between each of signals.

In accordance with a preferred embodiment of the present invention, it is an object of the present invention to provide a system, a wireless repeater and a method for canceling an echo further comprising a complex filter for selectively masking a signal outside a signal band and an ALC for maintaining a level of an output signal constant to prevent a distortion and an oscillation of a repeated signal.

In order to achieve above-described object of the present invention, there is provided a system for canceling an echo component, comprising: a first complex correlator for subjecting an input signal and a delayed feedback signal to a correlation operation to periodically analyze a plurality of echo components; and a first adaptive filter including a number of N adaptive algorithm blocks of a number of L taps and a number of N variable delaying means delay-inputting the delayed feedback signal to the adaptive algorithm blocks, the first adaptive filter outputting a first output signal obtained by adaptively canceling the plurality of echo components of the input signal, wherein each of the adaptive algorithm blocks is allocated to a time period having a peak value larger than a predetermined value according to the correlation operation of the first complex correlator to generate each of the plurality of echo components by adjusting the variable delay means.

There is also provided a wireless repeater for canceling an echo component, comprising: a receiving antenna for receiving a signal to be repeated; a received signal processor for converting the signal to be repeated received by the receiving antenna to an input signal via an intermediate frequency conversion and a digital conversion; a first complex correlator for subjecting the input signal and a delayed feedback signal to a correlation operation to periodically analyze a plurality of echo components; a first adaptive filter for allocating each of a plurality of adaptive algorithm blocks to a time period having a peak value larger than a predetermined value according to the correlation operation of the first complex correlator by receiving the input signal and the delayed feedback signal, the first adaptive filter generating each of the plurality of echo components and then outputting a first output signal obtained by adaptively canceling the plurality of echo components of the input signal; a transmission signal processor for converting the first output signal to a transmission signal via an analog conversion and an up-conversion; and a transmission antenna for transmitting the transmission signal.

There is also provided a method for canceling an echo component, the method comprising steps of: (a) subjecting an input signal and a delayed feedback signal to a correlation operation to periodically analyze a plurality of echo components; and (b) allocating each of a plurality of adaptive algorithm blocks to a time period of the delayed feedback signal having a peak value larger than a predetermined value according to the correlation operation of the step (a) to generate each of the plurality of echo components and adaptively canceling the echo components from the input signal to generate a first output signal.

DETAILED DESCRIPTION OF THE INVENTION

The present invention will now be described in detail with reference to the accompanied drawings. The interpretations of the terms and wordings used in Description and Claims should not be limited to common or literal meanings. The embodiments of the present invention are provided to describe the present invention more thoroughly for those skilled in the art.

Figure 1:
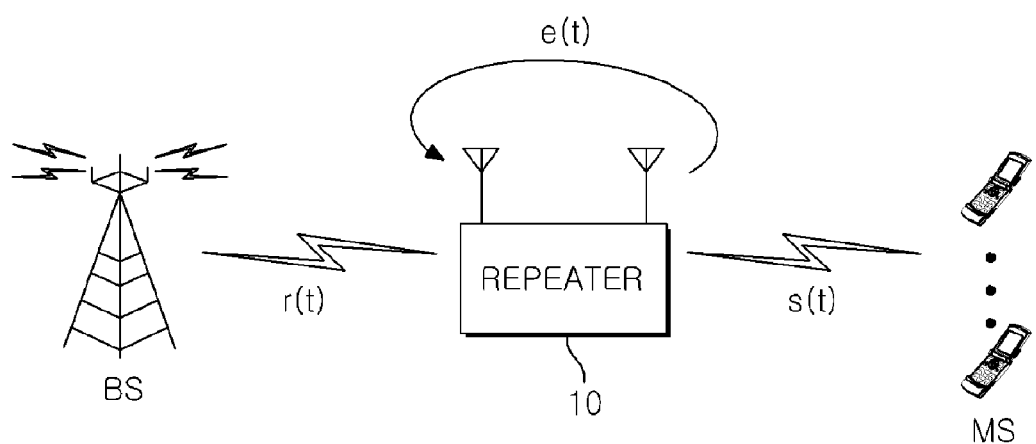
FIG. 1 is a diagram exemplifying a repeating environment of a wireless repeater.
Figure 2:
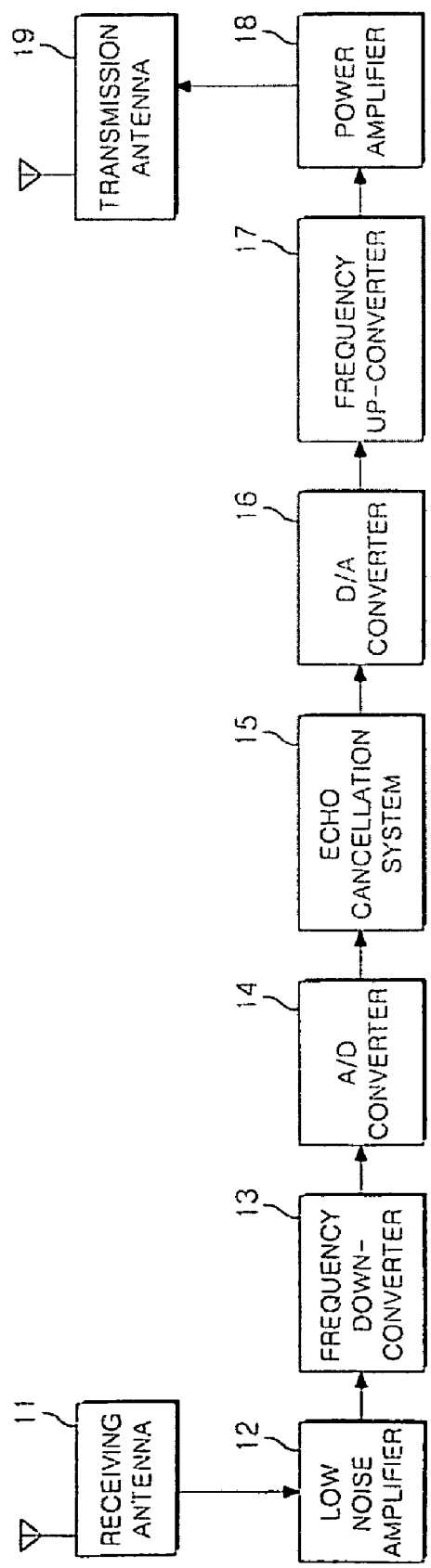
FIG. 2 is a configuration diagram illustrating an ICS wireless repeater including a system for canceling an echo component.
Figure 3:
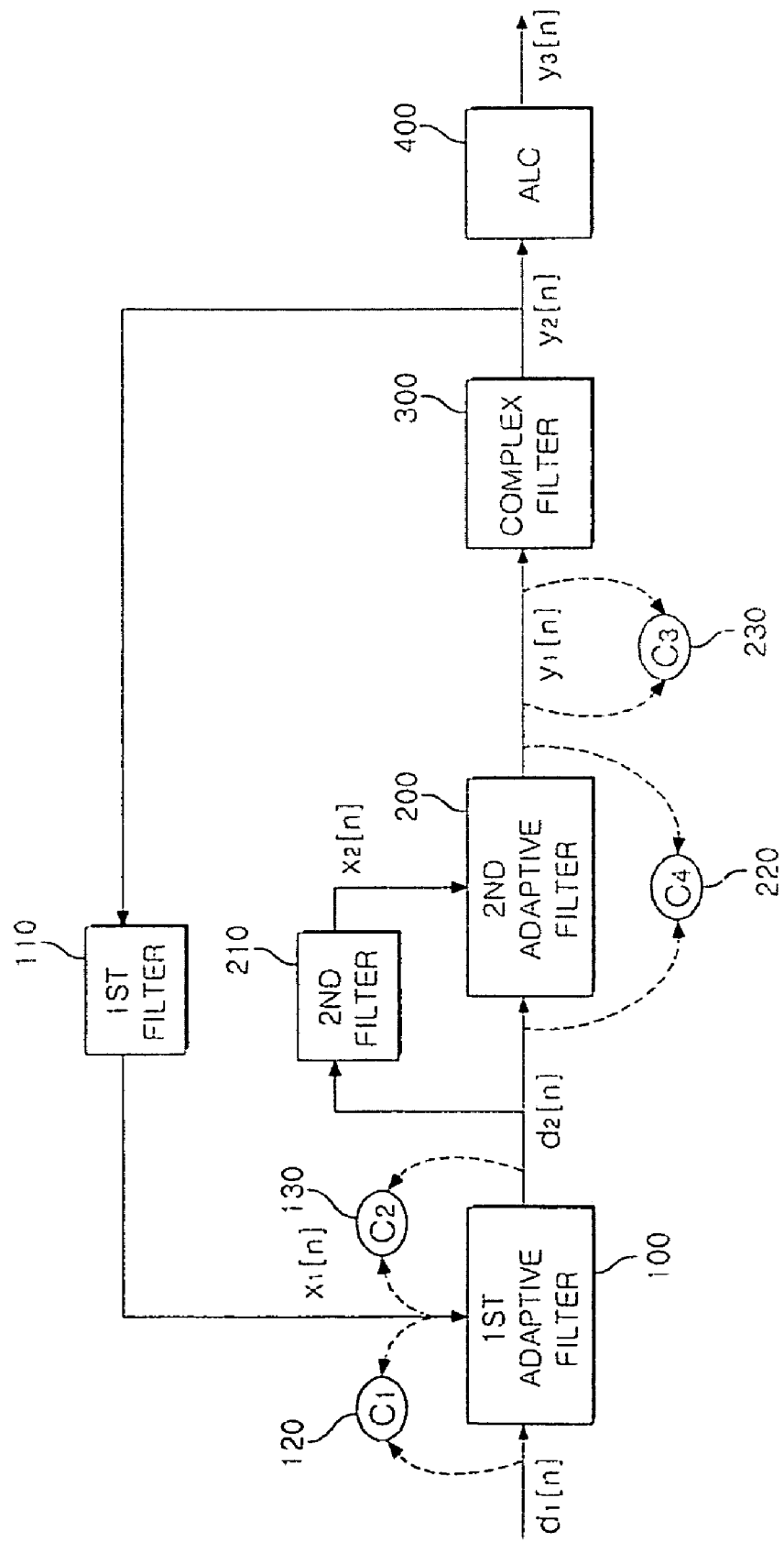
FIG. 3 is a configuration diagram illustrating a system for canceling an echo component in accordance with a preferred embodiment of the present invention.

FIG. 3 is a configuration diagram illustrating a system 15 for canceling an echo component in accordance with a preferred embodiment of the present invention.

The system 15 for canceling the echo component includes a first complex correlator 120 and a first adaptive filter 100 to cancel the echo component e(t) generated by a backflow of a signal via a receiving antenna 11 repeated through a transmission antenna 19 of a repeater.

In accordance with the present invention, an input signal $d_1[n]$ refers to a digital signal obtained by converting a received signal received through the receiving antenna 11 through a low noise amplifier 12, a frequency down-converter 13 and an A/D converter 14. a delayed feedback signal $x_1[n]$ refers to a digital output signal y[n] obtained by canceling the echo component thereof through the system 15 for canceling the echo component, that is, a signal to be transmitted to a mobile station (MS) or a base station (BS) through the transmission antenna 19 wherein the signal is obtained by delaying a signal prior to passing a D/A converter 16 by a first delay 110 to be fed back to the first adaptive filter 100.

<An Analysis of the Echo Component Using the First Complex Correlator>

The first complex correlator 120 subjects the input signal $d_1[n]$ and the delayed feedback signal $x_1[n]$ to a correlation operation to periodically analyze a plurality of echo components.

For instance, when a number of K echo components is assumed to be inputted in a feedback path from the transmission antenna 19 to the receiving antenna 11, a relation shown by equation 1 is satisfied between the input signal $d_1[n]$ and an output signal $y_2[n]$.

$$d_1[n] = s[n] + \sum_{k=1}^{K} A_k e^{j\phi_k} y_2[n - m_k - n_0] \quad \text{[Equation 1]}$$

S[n] represents an original signal outputted from the base station or a terminal, n0 represents a delay time by output/input of a repeater system 10, and $A_\chi \cdot \Phi_\chi \cdot m_\chi$ represents an amplitude, a phase and a delay time of the echo component by a $k^{th}$ echo path.

Figure 4:
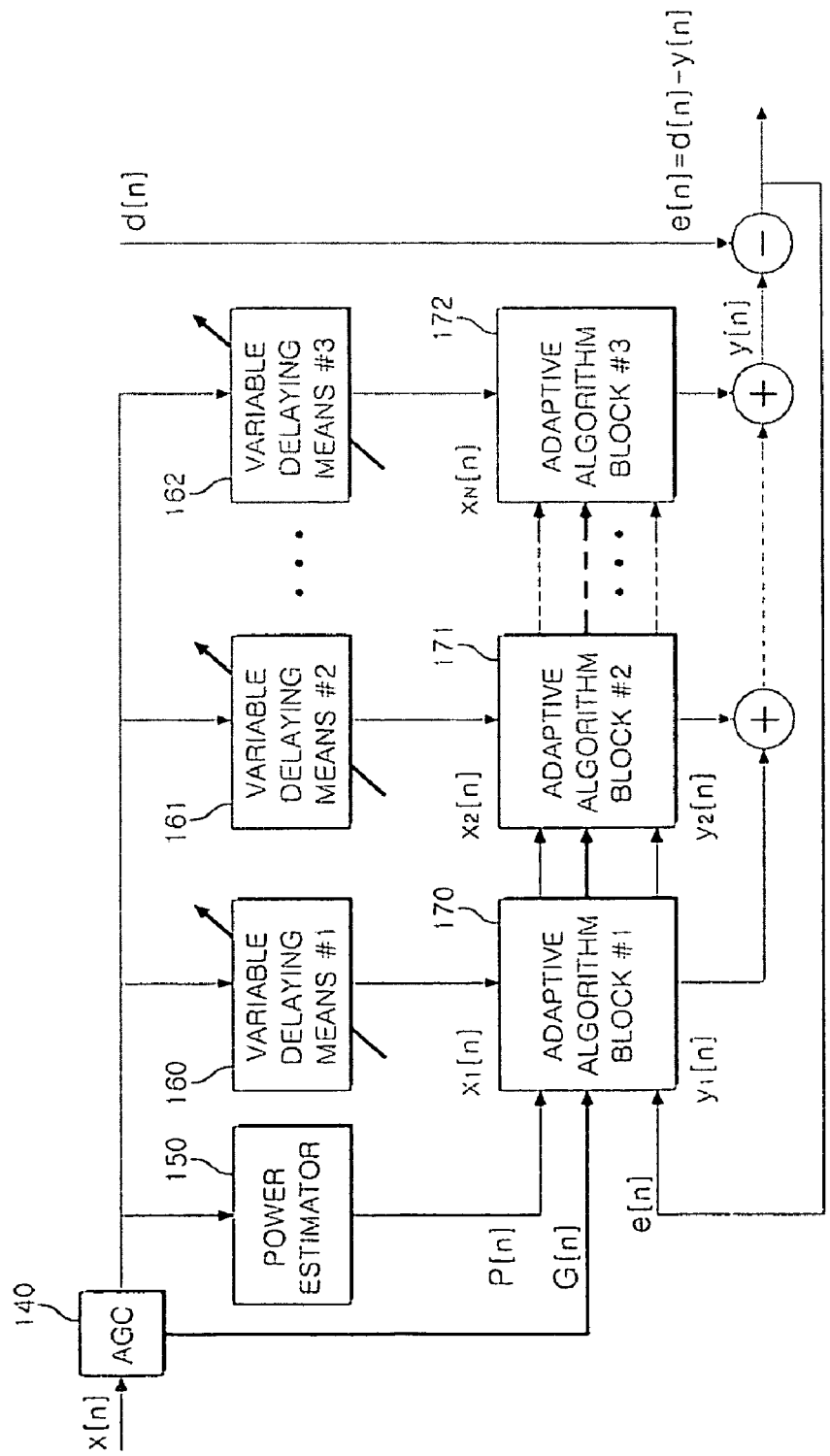
FIG. 4 is a configuration diagram illustrating a first adaptive filter in detail in accordance with a preferred embodiment of the present invention.

On the other hand, it is preferable that the first adaptive filter 100 further comprises an AGC (Automatic Gain control) 140 for maintaining a power of the delayed feedback signal $x_1[n]$ constant as shown in FIG. 4.

When the original signal s[n] and the output signal $y_2[n]$ does not have a correlation and the AGC 140 having an amplitude gain $G_{AGC}$ is applied to the delayed feedback signal $x_1[n]$, an output $C_1(m)$ of the first complex correlator 120 may be expressed as equation 2.

$$\begin{aligned} C_1(m) &= E\{x_1^*[n-m]d_1[n]\} \quad \text{[Equation 2]} \\ &= G_{AGC} E\{y_2^*[n-m-n_0]d_1[n]\} \\ &= G_{AGC} \sum_{k=1}^{K} A_k e^{j\phi_x} E \\ &\quad \{y_2^*[n-m-n_0]y_2[n-m_k-n_0]\} \\ &= G_{AGC} \sum_{k=1}^{K} A_k e^{j\phi_x} R_y(m-m_k) \end{aligned}$$

$R_y(m)$ represents an auto-correlation function of the output signal $y_2[n]$. $|R_y(m)|$ has a maximum value at m=0 due to a characteristic of the auto-correlation function, and a value of the function at m=0 is a power of the signal. When the output signal $y_2[n]$ is assumed to be a white Gaussian noise (WHN) of a limited band, $|R_y(m)|$ has a form of a sinc function.

Figure 7:
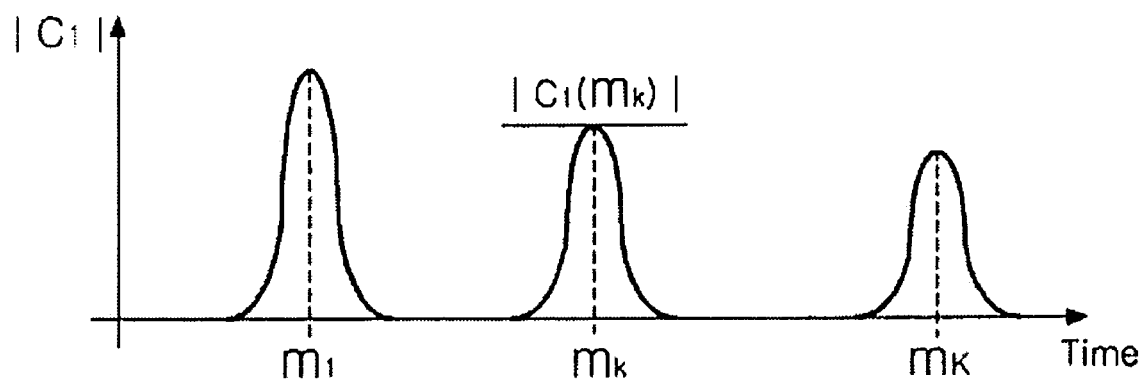
FIG. 7 is an output graph of a first complex correlator in accordance with a preferred embodiment of the present invention.

FIG. 7 illustrates the output $|C_1(m)|$ of the first complex correlator 120. The number of K peak values appear for the number of K echo components, and an information of the echo path may be known from each of the peak values. $m_k$ which is a position on a time axis of a $k^{th}$ peak value represents the delay time of the echo path, and the peak value $|C_1(m_k)|$ may be expressed as equation 3.

$$C_1(m_k) \approx G_{AGC} A_k e^{j\phi_k} R_y(0) \qquad \text{[Equation 3]}$$
$$= G_{AGC} A_k e^{j\phi_k} P_y$$

$P_y$ is the power of the output signal $y_2[n]$) and is same as $C_3(0)$ of an output $C_3$ of a third complex correlator 320. On the other hand, since an output $P_{AGC}$ of the AGC is predetermined, $G_{AGC}$ may be expressed as equation 4.

$$G_{AGC} = \sqrt{\frac{P_{AGC}}{P_y}} \qquad \text{[Equation 4]}$$
$$= \sqrt{\frac{P_{AGC}}{C_3(0)}}$$

The amplitude and the phase $A_k \cdot \Phi_k$ of the $k^{th}$ echo component may be expressed as equation 5 from equations 3 and 4.

$$A_k = \frac{|C_1(m_k)|}{\sqrt{P_{AGC} C_3(0)}} \qquad \text{[Equation 5]}$$
$$\phi_k = \tan^{-1} \frac{\text{Im}(C_1(m_k))}{\text{Re}(C_1(m_k))}$$

The first complex correlator 120 transmits the amplitude and the phase of the $k^{th}$ echo component to the first adaptive filter 100 described below.

<Cancellation of the Echo Component Using the First Adaptive Filter>

The first adaptive filter 100 includes a number of N adaptive algorithm blocks of a number of L taps 170, 171 and 172 (for instance, twelve 8-tap adaptive algorithm blocks) and a number of N variable delaying means 160, 161 and 162 delay-inputting the delayed feedback signal $x_1[n]$ to the adaptive algorithm blocks 170, 171 and 172 independently to output a first output signal ($e[n]$ of FIG. 4 and $d_2[n]$ of FIG. 3) obtained by adaptively canceling the plurality of echo components of the input signal $d_1[n]$.

The first adaptive filter 100 allocates each of the adaptive algorithm blocks 170, 171 and 172 to a time period having a peak value larger than a predetermined value according to the correlation operation of the first complex correlator 120 to generate each of the plurality of echo components by adjusting the variable delay means 160, 161 and 162.

Figure 11:
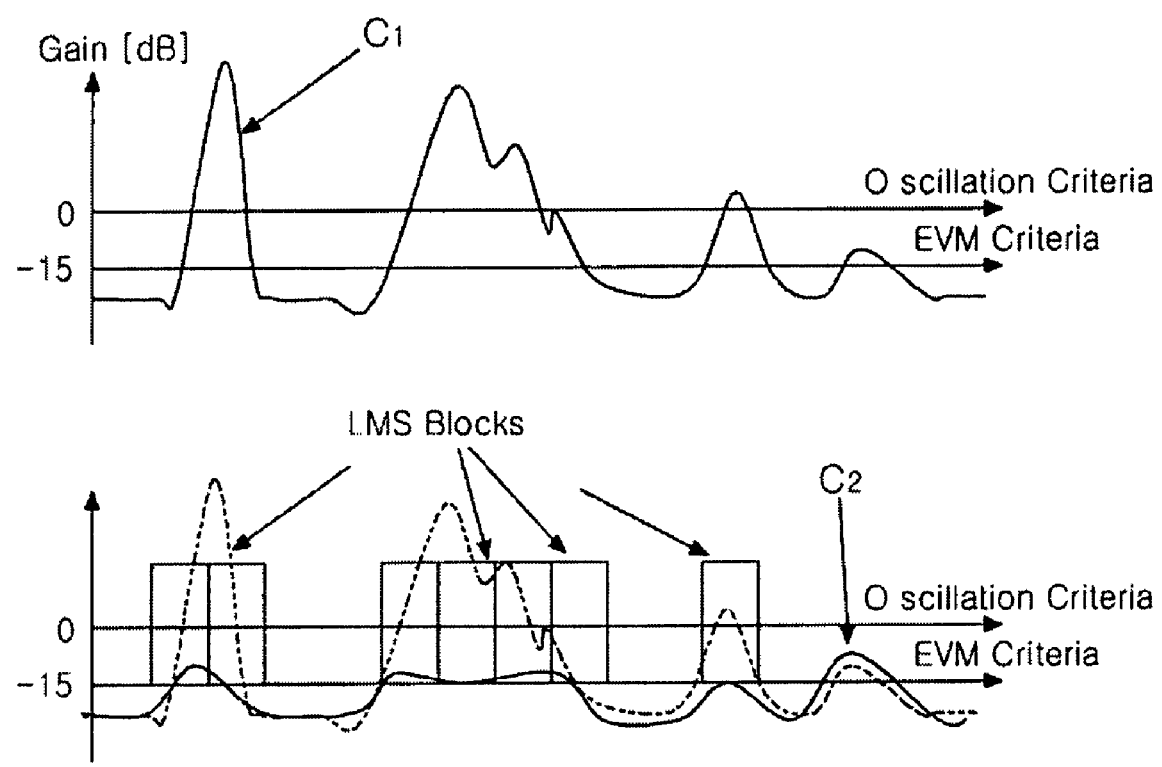
FIG. 11 is a graph exemplifying an allocation of an adaptive algorithm block in accordance with a preferred embodiment of the present invention.

That is, the number of N adaptive algorithm blocks 170, 171 and 172 of the first adaptive filter 100 independently correspond to the number of k echo components detected from the first complex correlator 120 to replicate the echo component. In order to achieve this, the delay time of each of the delaying means 160, 161 and 162 is independently configured so as to independently correspond to the delay time of each of the number of k echo components detected from the first complex correlator 120. Therefore, the echo component having the delay time larger than N?L (where N is the number of adaptive algorithm blocks and L is the number of the taps of adaptive algorithm block) may be removed by configuring the delay time of the delaying means 160, 161 and 162 to be long without increasing the tap of the adaptive algorithm blocks 170, 171 and 172. When k which is the number of the echo component is smaller than N which is the number of adaptive algorithm blocks, it is preferable that the adaptive algorithm blocks 170 and 171 are controlled such that the adaptive algorithm blocks 170 and 171 are adjacent or overlapped in time as shown in FIG. 11 to improve a performance of canceling the echo.

The allocation of the adaptive algorithm blocks 170, 171 and 172 is described below with reference to FIG. 11. The adaptive algorithm blocks 170, 171 and 172 may be selectively allocated for a time period having loop gain of a channel is no less than −15 dB by monitoring the output of the first complex correlator 120.

<An Operation of the Adaptive Algorithm Block>

Figure 5:
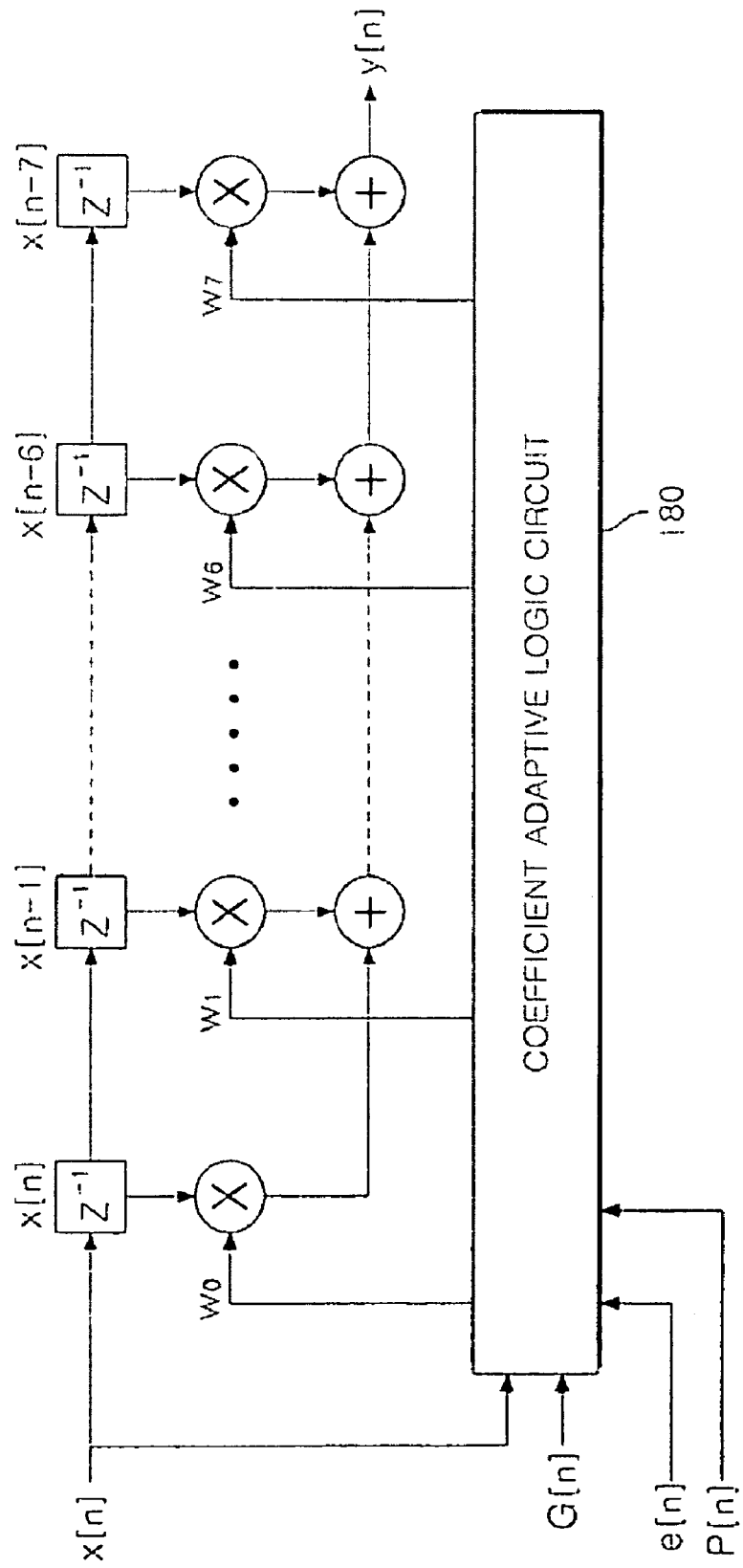
FIG. 5 is a configuration diagram illustrating an adaptive algorithm block in detail in accordance with a preferred embodiment of the present invention.

FIG. 5 illustrates a detailed configuration 6f the adaptive algorithm blocks 170, 171 and 172. While FIG. 5 shows an example having eight taps, the number of taps of each block may be properly selected according to an environment of use. While an NLMS (Normalized LMS) algorithm is exemplified as an adaptive algorithm in accordance with the present invention, the adaptive algorithm is not limited to the NLMS algorithm but may be selected from other algorithms according to the environment of use. Each of the adaptive algorithm blocks 170, 171 and 172 includes a multiplication accumulation (MAC) structure required for a finite impulse response (FIR) operation of an LMS adaptive filter and a coefficient adaptive logic operator 180 embodying a coefficient adaptive algorithm.

Each of the NLMS adaptive algorithm blocks predicts the echo component by the well-known NLMS algorithm. A detailed description is given below. When the adaptive algorithm block has the number of L taps and the delay time of the variable delaying means 162 of the $k^{th}$ adaptive algorithm block is $n_k$, a complex input data vector $X_{k,n}$ and a complex coefficient vector $W_{k,n}$ at a sampling time n may be expressed as equation 6.

$$X_{k,n} = \begin{bmatrix} x[n-n_k] \\ x[n-n_k-1] \\ \vdots \\ \vdots \\ x[n-n_k-L+1] \end{bmatrix}, \qquad \text{[Equation 6]}$$

$$W_{k,n} = \begin{bmatrix} w_{k,0} \\ w_{k,1} \\ \vdots \\ \vdots \\ w_{k,L-1} \end{bmatrix}$$

An output $y_y[n]$ of the $k^{th}$ NLMS adaptive algorithm block may be expressed as equation 7.

$$y_k[n] = W_{k,n}^* X_{k,n}, \qquad \text{[Equation 7]}$$
where $W_{k,n}^* = [w_{k,0}^* w_{k,1}^* \ldots \ldots w_{k,L-1}^*]$.

The coefficient adaptive algorithm of the coefficient vector $W_{k,n}$ may be expressed as equation 8.

$$W_{k,n} = W_{k,n-1} + \frac{\mu_k e^*[n] X_{k,n}}{\varepsilon + P[n]} \qquad \text{[Equation 8]}$$

A constant is configured from outside, and the output $e[n]$ and an average power $P[n]$ is calculated and inputted outside the block for each sample.

The average power P[n] may be calculated from equation 9 using the delayed feedback signal x[n] at a power estimator 150.

$$P[n] = \frac{\sum_{k=0}^{N-1} |x[n-k]|^2}{N}$$ [Equation 9]

A sum y[n] of the output of each of the adaptive algorithm blocks 170, 171 and 172 may be expressed as equation 10 according to equation 7.

$$y[n] = \sum_{k=1}^{N} y_k[n]$$ [Equation 10]

$$= \sum_{k=1}^{N} W_{k,n}^* X_{k,n}$$

The error signal e[n]=d[n]−y[n] which is the output signal of the first adaptive filter 100 is reused as the input signal of adaptive algorithm blocks 170, 171 and 172 to be provided to the coefficient adaptive algorithm of equation 8.

<Embodiment in Case the First Adaptive Filter Includes the AGC>

As described above, it is preferable that the first adaptive filter 100 further comprises the AGC 140. Due to the echo component re-inputted through the receiving antenna 11, a fading component is generated in a wireless environment and a magnitude of a change thereof may be about 30 dB. In addition, when a reflector within the echo path is moving at a high speed, a speed of the change of the echo component is also drastically increased accordingly. Assuming that the first delay 110 operates perfectly, the output e[n] thereof may maintain the power constant. However, when the cancellation of the echo component is not sufficient instantaneously, the output e[n] cannot maintain the power constant due to the fading component. Accordingly, a change on the input of the adaptive algorithm is increased and a performance of the cancellation of the echo component is degraded resulting in an oscillation. In order to prevent this phenomenon, the delayed feedback signal x[n] is inputted to the first adaptive filter 100 after passing through the AGC 140 to regulate the power as shown in FIG. 4, thereby effectively canceling the echo component.

When the delayed feedback signal x[n] is inputted to the first adaptive filter 100 after passing through the AGC 140, the NLMS algorithm is modified as described below. Assuming that the AGC 140 is not used, an input signal having a constant power is a WGN (White Gaussian Noise) belonging to a limited band, and the first adaptive filter 100 is operating normally, a relation expressed in equation 11 is satisfied between the output signal e[n] and the delayed feedback signal x[n].

$$x[n] = e[n-n_d]$$ [Equation 11]

When $n_d$ (a system delay simulated by the first delay 110) is sufficiently large, the output signal e[n] and the delayed feedback signal x[n] may be regarded as statistically independent signal, and an expected value of a random variable satisfies equation 12.

$$E\{e[n]\} = E\{x[n]\} = 0$$

$$\text{rms}\{|e[n]|\} = \text{rms}\{|x[n]|\} \approx \sqrt{P[n]}$$

$$\text{rms}\{|e^*[n]x[n]|\} = \text{rms}\{|e[n]|\}\text{rms}\{|x[n]|\} = P[n]$$ [Equation 12]

E represents the expected value, and rms represents a root mean square.

A coefficient of each of the blocks satisfies equation 13 from equations 12 and 8.

$$E[W_{k,n} - W_{k,n-1}] = \frac{\mu_k E\{e^+[n]x_{k,n}\}}{\varepsilon + P[n]} = 0$$ [Equation 13]

$$\text{rms}\{W_{k,n} - W_{k,n-1}\} = \frac{\mu_k P[n]}{\varepsilon + P[n]}$$

$$\approx \mu_k [1,1,\ldots 1]^T$$

That is, an average change between the coefficients is zero and a change of rms is which is constant regardless of an input power. This is a characteristic of the NLMS algorithm.

On the contrary, when the AGC 140 is included in the delayed feedback signal x[n], and assuming that an amplitude gain of the AGC 140 is G[n] and a change in the gain is sufficiently slow than a data rate, that is, G[n]≈, equation 14 is satisfied.

$$E\{e[n]\} = E\{x[n]\} = 0$$

$$\text{rms}\{G|e[n]|\} = \text{rms}\{|x[n]|\} \approx \sqrt{P_{AGC}[n]}$$

$$\text{rms}\{|e^*[n]x[n]|\} = \text{rms}\{|e[n]|\}\text{rms}\{|x[n]|\} = P_{AGC}[n]/G$$ [Equation 14]

Therefore, the coefficient of each of the blocks satisfies equation 15.

$$E\{W_{k,n} - W_{k,n-1}\} = \frac{\mu_k E\{e^+[n]x_{k,n}\}}{\varepsilon + P_{AGC}[n]} = 0$$ [Equation 15]

$$\text{rms}\{W_{k,n} - W_{k,n-1}\} = \frac{\mu_k P_{AGC}[n]/G}{\varepsilon + P_{AGC}[n]}$$

$$\approx \frac{\mu_k}{G}[1,1,\ldots 1]^T$$

On the other hand, because the AGC 140 should maintain $G^2 \times \text{Var}\{|e[n]|\}$ constant, G[n] varies according to a average power of the output signal e[n]. Therefore, a step change of the coefficient of equation 15 is differentiated resulting in a loss of the characteristic of NLMS algorithm. However, this problem may be solved by multiplying the gain of the AGC 140 during a step calculation process of the coefficient adaptive algorithm of each of the LMS blocks. That is, the coefficient adaptive formula of equation 8 is changed as equation 16.

$$W_{k,n} = W_{k,n-1} + \frac{G[n]\mu_k e^*[n]X_{k,n}}{\varepsilon + P_{AGC}[n]}$$ [Equation 16]

<Monitoring a Echo Cancellation Rate Using a Second Complex Correlator>

It is preferable that the system for canceling the echo component subjects the delayed feedback signal $x_1[n]$ and the first output signal $d_2[n]$ using the second complex correlator 130 in order to monitor the echo cancellation rate of the first adaptive filter 100.

Figure 8:
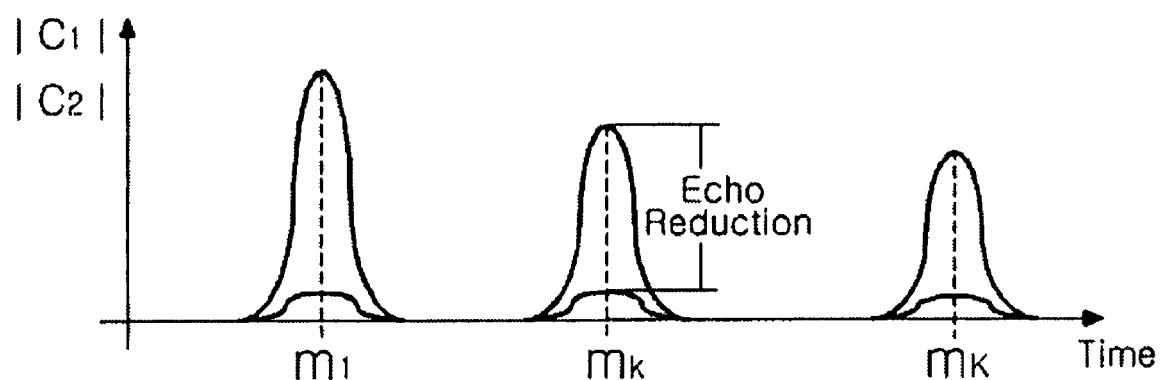
FIG. 8 is an output graph of a first complex correlator and a second complex correlator in accordance with a preferred embodiment of the present invention.

FIG. 8 illustrates the output $C_1(m)$ of the first complex correlator 120 and an output $C_2(m)$ of the second complex correlator 130. Because the output C2(m) of the second complex correlator 130 is a correlation of the delayed feedback signal x[n] and the first output signal $d_2[n]$ having the echo component thereof cancelled, the peaks that appears in the output C1(m) of the first complex correlator 120 which is a correlation of the delayed feedback signal x[n] and the input signal $d_1[n]$ prior to having the echo component thereof cancelled appears lower by an amount of the echo cancellation rate of the first adaptive filter 100.

Therefore, the echo cancellation rate $R_k$ for the $k_{th}$ echo component may be defined as equation 17.

$$R_k[dB] = 20\log\frac{|C_1(m_k)|}{|C_2(m_k)|} \qquad \text{[Equation 17]}$$

Through the above-described method, the second complex correlator 130 monitors whether the first adaptive filter operates normally.

<Cancellation of the Fading Component Using a Fourth Complex Correlator and a Second Adaptive Filter>

In accordance with the present invention, the fading component by multiple paths of the received signal received through the receiving antenna 11 from the base station or the mobile station may be easily cancelled using a fourth complex correlator 220 and a second adaptive filter 200.

The cancellation of the fading component is similar to the cancellation of the echo component by the first adaptive filter 100. First, the fourth complex correlator 220 subjects the first output signal $d_2[n]$ and a second output signal $y_2[n]$ to the correlation operation. The second adaptive filter 200 includes a number of M adaptive algorithm blocks 270, 271 and 272 of the number of L taps and a number of M variable delaying means 260, 261 and 262 delay-inputting the delayed first output signal x2[n] to the adaptive algorithm blocks 270, 271 and 272 to output the second output signal $y_1[n]$ obtained by adaptively canceling the fading component from the first output signal $d_2[n]$.

Each of the adaptive algorithm blocks 270, 271 and 272 is allocated to the time period having the peak value larger than the predetermined value according to the correlation operation of the fourth complex correlator 220 to generate each of the fading components by adjusting the variable delay means 260, 261 and 262.

Figure 6:
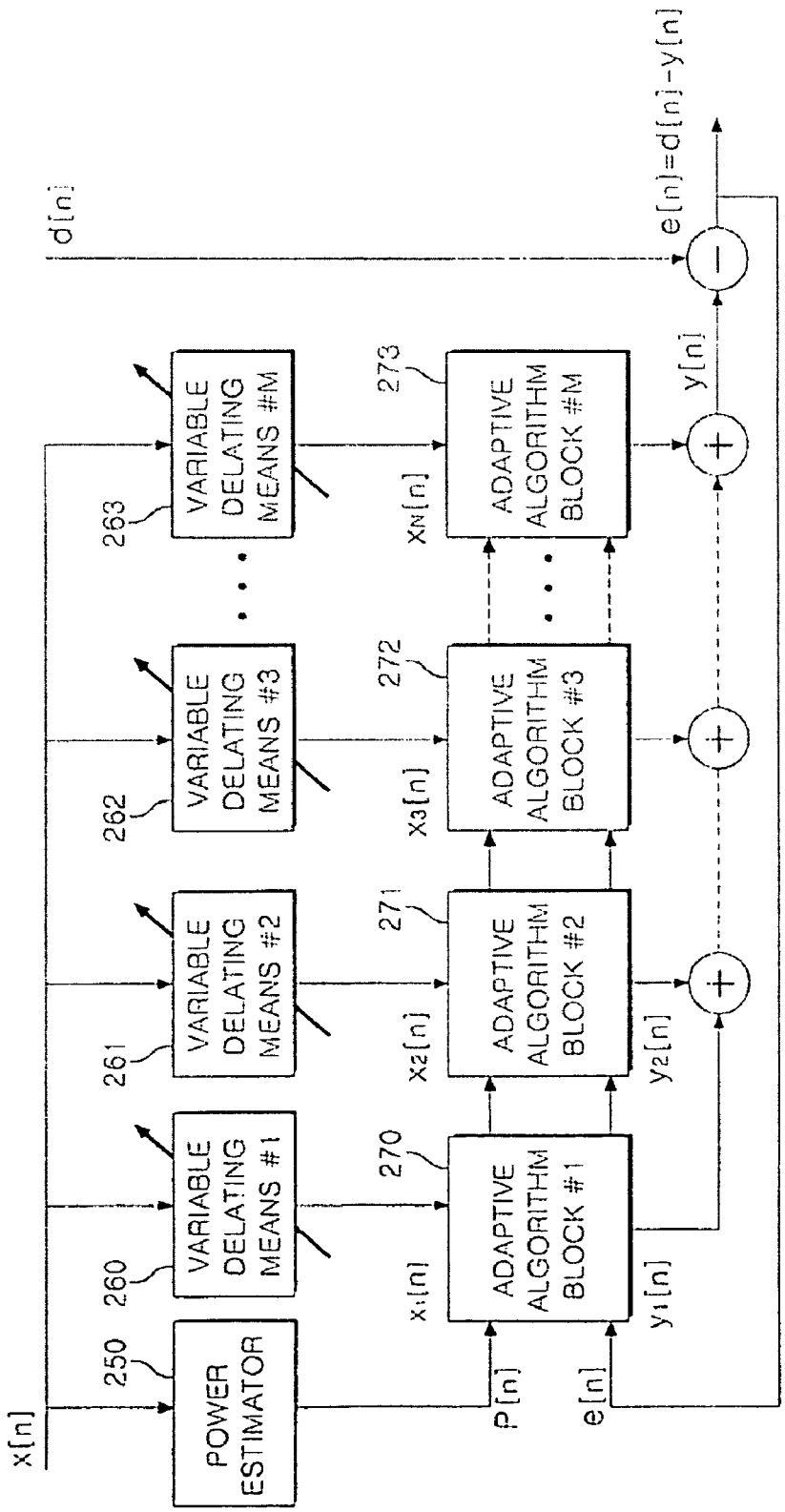
FIG. 6 is a configuration diagram illustrating an adaptive filter in detail in accordance with a preferred embodiment of the present invention.

FIG. 6 illustrates the second adaptive filter 200 in accordance with the preferred embodiment of the present invention. Because the output signal of the second adaptive filter 200 already has the echo component affecting the oscillation the most cancelled by the first adaptive filter 100, it is preferable that the AGC 140 is not used contrary to the first adaptive filter 100 due to a low possibility of the oscillation. Since the operations of the fourth complex correlator 220 and the second adaptive filter 200 are identical to that of the first complex correlator 120 and the first adaptive filter 100 respectively, a detailed description thereof is omitted.

<Monitoring a Fading Cancellation Rate Using a Third Complex Correlator>

Similar to the monitoring of the echo cancellation rate using the second complex correlator, it is preferable that the second output signal $y_1[n]$ to the auto-correlation operation using a third complex correlator 230 in order to monitor the fading cancellation rate of the original signal by the second adaptive filter 200

When the feedback the echo component is cancelled through the first adaptive filter 100, the first output signal $d_2[n]$ of the first adaptive filter 100 may be expressed as a sum of the original signal s[n] and the fading component of the original signal as in equation 18.

$$d_2[n] = s[n] + \sum_{i=1}^{K} B_i e^{j\varphi_i} s[n - m_i] \qquad \text{[Equation 18]}$$

The output of the third complex correlator 230 without operating the second adaptive filter may be expressed as equation 19.

$$\begin{aligned}C_3(m) &= E\{d_2^*[n-m]d_2[n]\} \qquad \text{[Equation 19]}\\ &= \left(1 + \sum_{i=1}^{K} B_i^2\right) R_d(m) + \sum_{i=1}^{K} B_i e^{j\varphi} R_d(m - m_i) + \\ &\quad \sum_{i=1}^{K} B_i e^{-j\varphi_i} R_d^*(m + m_i)\end{aligned}$$

$R_d(m)$ equals to the auto-correlation function of the first output signal $d_2[n]$. The fading component of the original signal s[n] does not have the gain in the echo path contrary to the feedback echo component, and an amplitude$_{B1}$ may be assumed to be sufficiently smaller than 1 when an LOS (line of sight) is secured between a signal source and the repeater system 10. In addition, equation 19 may be approximated as equation 20 because the delay time should be larger than 0.

$$C_3(m) \approx R_d(m) + \sum_{i=1}^{K} B_i e^{j\varphi_i} R_d(m - m_i) \qquad \text{[Equation 20]}$$

Figure 9:
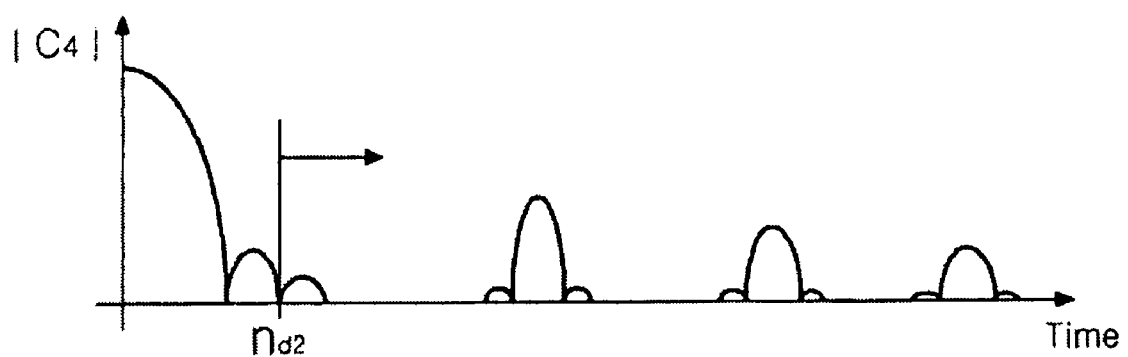
FIG. 9 is an output graph of a fourth complex correlator in accordance with a preferred embodiment of the present invention.

FIG. 9 illustrates an output $|C_3(m)|$ of the third complex correlator 230 when the second adaptive filter 200 is not in operation. Because the output of the third complex correlator 230 is the auto-correlation function contrary to the output of the complex correlators 120, 130 and 220, the output of the third complex correlator 230 starts at m=0 and the echo component appears thereafter. The second adaptive filter 200 cancels the fading component pf the original signal longer than $n_{d2}$ which is a point at which a second zero of the auto-correlation function appears by setting $n_{d2}$ as the delay time of the first pad 210.

Figure 10:
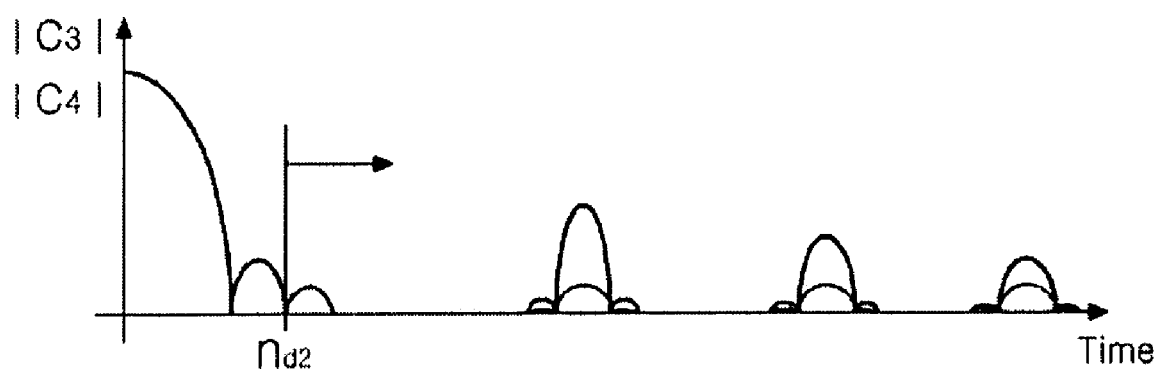
FIG. 10 is an output graph of a third complex correlator and a fourth complex correlator in accordance with a preferred embodiment of the present invention.

FIG. 10 illustrates the outputs of the fourth complex correlator 220 and the third complex correlator 230 when the second adaptive filter 200 is in operation. As shown, the autocorrelation function of the third complex correlator 230 shows a result wherein the fading component of the original signal is drastically cancelled. Using a method similar to that of obtaining the echo cancellation rate of the first adaptive filter 100 through the first complex correlator 120 and the second complex correlator 130, the fading cancellation rate of the second adaptive filter 200 may be monitored by comparing the outputs of the fourth complex correlator 220 and the third complex correlator 230.

<Signal Band Masking by a Complex Filter>

A complex filter 300 which is a complex coefficient FIR filter masks a signal of the output signals (the first output signal $d_2[n]$ when the second adaptive filter 200 is not included and the second output signal $y_1[n]$ when the second adaptive filter 200 is included) other than that of a signal band to selectively pass a signal of the signal band.

In accordance with the embodiment wherein the complex filter 300 is not included, the characteristic outside the signal band of the digital outputs by the adaptive filters 100 and 200 becomes different from the delay feedback signal x[n] by the band filter during the conversion of frequency. Accordingly, the performance of canceling the echo of the repeater is degraded and a probability of oscillation is increased. Therefore, it is preferable that an entire bandwidth of the complex filter 300 is set to be a little smaller than a bandwidth of the band filter used in the frequency down-converter 13 or the frequency up-converter 17 such that a spectrum of the delayed feedback signal x[n] and a spectrum of an external echo signal component are identical.

In addition, a bandwidth of the wireless repeater includes multiple frequency allocations (FAs). The FA not used may be amplified by a small error to oscillate because there is no input. Therefore, the complex filter 300 adjusts the coefficient in order to block such band, thereby preventing the oscillation.

<Controlling the Oscillation be an ALC>

As shown in FIG. 3, it is preferable that the system for canceling the echo component further comprises an ALC (Automatic Level Control) 400 in order to maintain a level of the output signal $y_2[n]$.

When the oscillation occurs despite the cancellation of the echo component by the first adaptive filter 100, the autocorrelation function of the third complex correlator 230 loses the characteristic of having the maximum value at m=0. When such change in the output of the third complex correlator 230 is detected, the ALC 400 may reduce a gain thereof to suppress the oscillation of the output signal.

Figure 12:
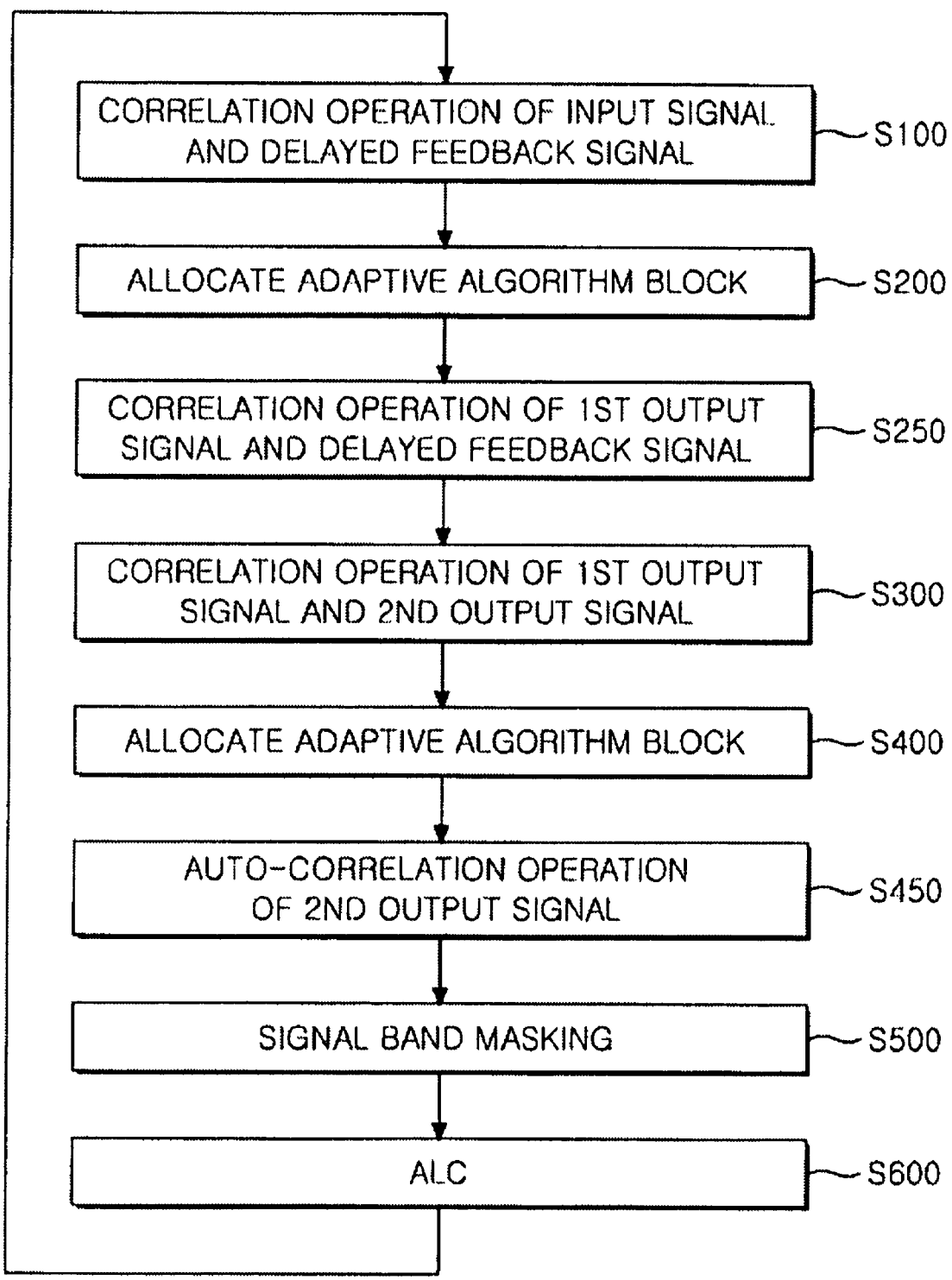
FIG. 12 is a flow diagram illustrating a method for canceling an echo component in accordance with a preferred embodiment of the present invention.

<Method for Canceling the Echo Component>FIG. 12 illustrates a method for canceling the echo component in accordance with the preferred embodiment of the present invention. In accordance with the method, the input signal $d_1[n]$ and the delayed feedback signal $x_1[n]$ are subjected to the correlation operation to periodically analyze a plurality of echo components (S100). Specifically, the first complex correlator 120 analyzes an information of the echo component to be replicated by each of the adaptive algorithm blocks 170, 171 and 172 in the first adaptive filter 100 by the samples through the correlation operation. A plurality of time period having a gain larger than the predetermined value according to the result of the correlation operation, preferably the gain of −15 dB or more, are extracted. It is preferable that the delayed feedback signal $x_1[n]$ is set to be delayed by an input/output delay time of the system.

Thereafter, each of the plurality of adaptive algorithm blocks 170, 171 and 172 to the time period of the delayed feedback signal $x_1[n]$ having a peak value larger than the predetermined value according to the result of the step S100 to generate each of the plurality of echo components and adaptively canceling the echo components from the input signal $d_1[n]$ to generate the first output signal ($d_2[n]$ of FIG. 3 and e[n] of FIG. 5) as shown in FIG. 11 (S200).

In the step S200, the first adaptive filter 100 sets the delay time of the delaying means 160, 161 and 162 independently included in each of the adaptive algorithm blocks 170, 171 and 172 for the delay tine of each of the echo component such that the first adaptive filter 100 may easily replicate and cancel the echo component having a long delay time even when each of the adaptive algorithm blocks 170, 171 and 172 have a little number of taps. It is preferable that the first adaptive filter 100 maintains the power of the delayed feedback signal $x_1[n]$ constant through the AGC 140 to prevent the oscillation of the first adaptive filter 100. It is also preferable that the adaptive algorithm blocks 170, 171 and 172 employs the LMS algorithm.

On the other hand, after carrying out the step S200, it is preferable that the method in accordance with the present invention further comprises subjecting the delayed feedback signal $x_1[n]$ and the first output signal $d_2[n]$ to the correlation operation to monitor the echo cancellation rate. By comparing the results of the correlation operation and the operation of the step S100, the echo cancellation rate by the first adaptive filter 100 may easily monitored, thereby easily determining whether the system is in normal operation.

In order to cancel the fading component generated due to the multiple path fading from a reception source (the base station in case of a forward link and the mobile station in case of a reverse link) to the receiving antenna 11 in addition to the echo component re-inputted to the receiving antenna 11, it is preferable that the method in accordance with the present invention further comprises subjecting the first output signal $d_2[n]$ and the second output signal $y_1[n]$ to the correlation operation to periodically analyze the plurality of fading components (S300), and allocating each of the plurality of adaptive algorithm blocks 270, 271, 272 and 273 to the time region of the first output signal $x_1[n]$ having the peak value larger than the predetermined value according to the correlation operation of the step S300 to generate the plurality of fading components and adaptively cancel the fading components from the first output signal $d_2[n]$ to generate the second output signal $y_1[n]$ (S400). Because the method for removing the fading component is similar to that of the echo component, a detailed description thereof is omitted.

After carrying out the step S400, it is preferable that the method in accordance with the present invention further comprises subjecting the second output signal $y_1[n]$ to the autocorrelation operation to monitor the echo cancellation rate of the fading component of the original signal. By comparing the results of the auto-correlation operation and the operation of the step S300, the fading cancellation rate of the original signal by the second adaptive filter 200 may easily monitored, thereby easily determining whether the system is in normal operation.

In order to prevent the oscillation by a distortion generated during the digital signal processing of the steps I through 4, the method in accordance with the present invention may further comprise masking the signal of the output signal $y_1[n]$ other than that of the signal band (S500) and preventing the level of the output signal $y_2[n]$ from increasing more than a predetermined level through the ALC 400 (S600).

As described above, in accordance with the system, the wireless repeater and the method for canceling the echo of the present invention, the adaptive filter including the plurality of adaptive algorithm blocks having the small number of filter taps independently allocates each of the adaptive algorithm blocks to the time period of the delayed feedback signal discretely to easily cancel the echo component close to the maximum delay time without increasing the number of the filter taps.

In accordance with the system, the wireless repeater and the method for canceling the echo of the present invention, the delay time of the plurality of variable delaying means is obtained through the correlation operation of the input signal and the delayed feedback signal to generate the plurality of delay components through the plurality of variable delaying means included in each of adaptive algorithm blocks.

In accordance with the system, the wireless repeater and the method for canceling the echo of the present invention, the plurality of adaptive algorithm blocks having the small number of filter taps are applied to the delayed signal of the signal having the echo component thereof removed to easily cancel the fading component by multiple paths of the region from the base station or the mobile station to the repeater.

In accordance with the system, the wireless repeater and the method for canceling the echo of the present invention, the echo cancellation rate of the adaptive filter is easily monitored through a correlation operation between each of signals.

In accordance with the system, the wireless repeater and the method for canceling the echo further of the present invention may further comprise the complex filter for selectively masking the signal outside the signal band and the ALC for maintaining the level of the output signal constant to prevent the distortion and the oscillation of the repeated signal.

What is claimed is:

1. A system for canceling an echo component, comprising:
a first complex correlator for subjecting an input signal and a delayed feedback signal to a correlation operation to periodically analyze a plurality of echo components;
a first adaptive filter including a number of N adaptive algorithm blocks of a number of L taps and a number of N variable delaying means delay-inputting the delayed feedback signal to the adaptive algorithm blocks, the first adaptive filter outputting a first output signal obtained by adaptively canceling the plurality of echo components of the input signal; and
a second complex correlator for monitoring an echo cancellation rate of the first adaptive filter by subjecting the delayed feedback signal and the first output signal to a correlation operation;
wherein each of the adaptive algorithm blocks is allocated to a time period having a peak value larger than a predetermined value according to the correlation operation of the first complex correlator to generate each of the plurality of echo components by adjusting the variable delay means.

2. The system of claim 1, further comprising:
a third complex correlator for subjecting the first output signal and a second output signal to a correlation operation to periodically analyze a plurality of fading components; and
a second adaptive filter including the number of N adaptive algorithm blocks of the number of L taps and a number of M variable delaying means delay-inputting the delayed first output signal to the adaptive algorithm blocks, the second adaptive filter outputting the second output signal obtained by adaptively canceling the plurality of fading components of the first output signal,
wherein each of the adaptive algorithm blocks is allocated to the time period having the peak value larger than the predetermined value according to the correlation operation of the third complex correlator to generate each of the plurality of fading components by adjusting the variable delay means.

3. The system of claim 1, wherein the first adaptive filter comprises an AGC for maintaining a power of the delayed feedback signal constant.

4. The system of claim 1, wherein a least means squares algorithm is applied to the adaptive algorithm blocks.

5. The system of claim 1, wherein a loop gain of a channel of the predetermined values is no less than −15 dB.

6. The system of claim 1, wherein the first adaptive filter comprises twelve eight-tap NLMS blocks.

7. The system of claim 1, further comprising a complex filter for selectively masking a signal other than that of a signal band of the output signals.

8. The system of claim 1, further comprising an ALC for maintaining a level of each of the output signals constant.

9. The system of claim 2, further comprising a third complex correlator for monitoring an echo cancellation rate of an original signal fading component of the second adaptive filter by subjecting the second output signal to an autocorrelation operation.

10. A wireless repeater for canceling an echo component, comprising:
a receiving antenna for receiving a signal to be repeated;
a received signal processor for converting the signal to be repeated received by the receiving antenna to an input signal via an intermediate frequency conversion and a digital conversion;
a first complex correlator for subjecting the input signal and a delayed feedback signal to a correlation operation to periodically analyze a plurality of echo components;
a first adaptive filter for allocating each of a plurality of adaptive algorithm blocks to a time period having a peak value larger than a predetermined value according to the correlation operation of the first complex correlator by receiving the input signal and the delayed feedback signal, the first adaptive filter generating each of the plurality of echo components and then outputting a first output signal obtained by adaptively canceling the plurality of echo components of the input signal;
a second complex correlator for monitoring an echo cancellation rate of the first adaptive filter by subjecting the delayed feedback signal and the first output signal to a correlation operation;
a transmission signal processor for converting the first output signal to a transmission signal via an analog conversion and an up-conversion; and
a transmission antenna for transmitting the transmission signal.

11. The repeater of claim 10, further comprising:
a third complex correlator for subjecting the first output signal and a second output signal to a correlation operation to periodically analyze a fading component; and
a second adaptive filter for allocating each of a plurality of adaptive algorithm blocks to a time period having a peak value larger than the predetermined value according to the correlation operation of the third complex correlator by receiving the first output signal and the delayed first output signal, the first adaptive filter generating the fading component and then outputting the second output signal obtained by adaptively canceling the fading component of the first output signal, and
wherein the transmission signal processor converts the second output signal to the transmission signal.

12. The repeater of claim 11, further comprising a complex filter for selectively masking a signal other than that of a signal band of the second output signal and an ALC for maintaining a level of the second output signal constant.

13. The repeater of claim 11, further comprising:
a third complex correlator for monitoring an echo cancellation rate of an original signal fading component of the second adaptive filter by subjecting the second output signal to an autocorrelation operation.

14. A method for canceling an echo component, the method comprising steps of:
(a) subjecting an input signal and a delayed feedback signal to a correlation operation to periodically analyze a plurality of echo components, utilizing a first complex correlator; and
(b) allocating each of a plurality of adaptive algorithm blocks to a time period of the delayed feedback signal having a peak value larger than a predetermined value according to the correlation operation of the step (a) to generate each of the plurality of echo components and adaptively canceling the echo components from the input signal to generate a first output signal; and monitoring an echo cancellation rate of the first adaptive filter by subjecting the delayed feedback signal and the first output signal to a correlation operation, utilizing a second complex correlator.

15. The method of claim 14, further comprising:

(c) subjecting the first output signal and a second output signal to a correlation operation to periodically analyze a plurality of fading components; and (d) allocating each of a plurality of adaptive algorithm blocks to a time period having a peak value larger than the predetermined value according to the correlation operation of the step (c) to generate the plurality of fading components and adaptively canceling the fading components from the first output signal to generate the second output signal.

16. The method of claim 14, wherein the step (b) comprises maintaining a power of the delayed feedback signal constant via an AGC.

17. The method of claim 14, wherein a least mean squares algorithm is applied to the adaptive algorithm blocks.

18. The method of claim 14, wherein a loop gain of a channel of the predetermined value is no less than −15 dB.

19. The method of claim 14, further comprising selectively masking a signal other than that of a signal band of the first output signal.

* * * * *